A. Fontayne.
Treadle.

No. 85,375.   Patented Dec. 29, 1868.

Witnesses  
James Moore  
David Fisher

Inventor  
A. Fontayne

United States Patent Office.

ALBERT FONTAYNE, OF CINCINNATI, OHIO.

Letters Patent No. 85,375, dated December 29, 1868.

IMPROVEMENT IN TREADLES.

The Schedule referred to in these Letters Patent and making part of the same.

*To all whom it may concern:*

Be it known that I, ALBERT FONTAYNE, of Cincinnati, in the county of Hamilton, and State of Ohio, have invented certain new and useful Improvements in Treadles; and I do hereby declare that the following is a full, clear, and exact description of the construction and operation of the same, reference being had to the annexed drawings, making part of this specification.

Heretofore there have been two lugs on the reverse side of the foot-plate, through which holes were drilled, and in which the shaft B worked. The making of these holes true was a laborious and comparatively costly process, and they were soon worn out of true, at the points on which the shaft B rested, after which the motion of the machine was less regular, a considerable increase of power was required to work it, and, as it would cost more to repair that defect in a treadle made in that way, than to purchase a new one, the user of a sewing-machine was compelled to purchase a new treadle as often as the said holes suffered any considerable wear from the friction of the shaft B. One object of my present improvements is to remedy these defects.

Another defect, of a similar character, resulted from the form of the piece L of the connecting-rod that conveyed the power from the treadle to the operative parts of the mechanism. In the connecting-rod now commonly in use for that purpose, the piece L is cut off where the red line is seen, (fig. 3,) so that, after the hole or journal-box M was worn somewhat by its reciprocal action with the pin R, it could not again be made of a regular form of bore by the screw H, by reason of the rigidity of the back, or part farthest removed from the said screw, after which its action was neither so regular nor so noiseless, and an increase of power was requisite to run the sewing-machine. Another object of my present improvements is to remedy this defect.

Similar letters refer to similar parts in all the figures.

A A are the foot-plates, through which power is imparted to the machine.

T T are bearings for the shaft B, cast upon the foot-plates.

E E are collars, made fast to the shaft B by pins, between and close to the bearings T T, their function being to keep the said shaft firm in its place.

F F are seats cast with the foot-plates, in which the ends of the pieces C C nearest the toes of the foot-plates rest. Holes are left in the foot-plates at that point, fig. 2.

C C are movable pieces, which, together with the bearings T T, form adjustable journal-boxes, in which the shaft B works.

Figure 2:
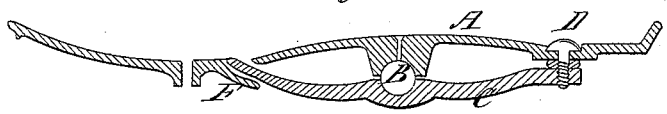
Figure 2 is a vertical section of same, through the line P Q, fig. 1, the upper side of the foot-plate being shown.

One end of each of the said pieces C C is firmly held in the seats F F, while the other end of each is made fast by the screws D D, which have their heads in cavities for that purpose, in the upper side of the foot-plates, fig. 2, so that the operator can regulate the bearings of the journal-boxes on the shaft B, without reversing the machine.

Between the foot-plate A and the movable pieces C C, at the points where the screws D D bind them, there are pieces of India rubber, or other elastic substance, clearly shown at fig. 2.

While the journals of the shaft B are properly fitted to their journal-boxes, the wear of each is uniform, and only tends to increase the bore of the box, as compared with the diameter of the journals; but, after sufficient wear has taken place to change the relative proportion of said parts, or to make the journals fit more or less loosely in their boxes, then the wear of the parts ceases to be uniform, and the evils before described very soon follow. But, by the aid of the screws D D, and the India rubber before described, the journals may be always kept properly fitted in their boxes.

Figure 3:
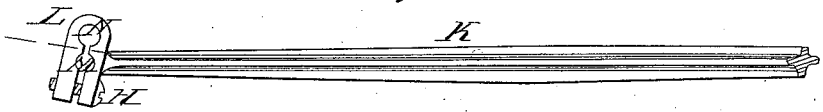
Figure 3 is a plan or plane view of the connecting-rod, which conveys power from the treadle to the operative mechanism of the sewing-machine, showing my improved mode of adjusting the connecting-rod with the treadle.

K, fig. 3, is the connecting-rod, which conveys the power from the treadle to the operative mechanism of the machine.

Figure 1:
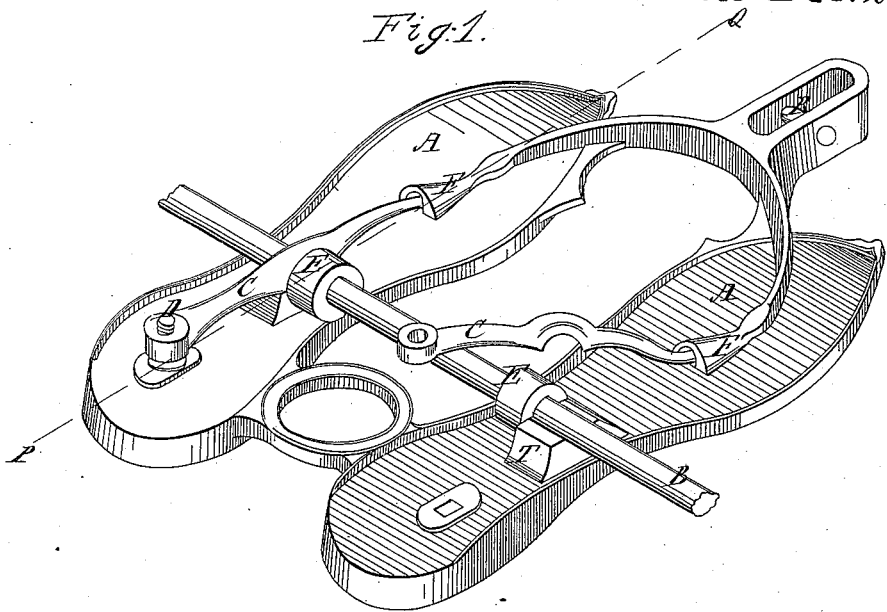
Figure 1 is a perspective view of the reverse side of the foot-plate, and the shaft on which it is supported, showing my improved mode of adjustable attachment.

M, fig. 3, is the journal-box or seat, in which the pin R, fig. 1, works.

N is a hole left in the casting, to serve as a spring, and to permit the part L to be uniformly tightened by the screw H, after the pin R and journal-box M have, by continued action, become worn, so as not to be a perfect fit.

Having thus described my invention,

What I claim as new, and desire to secure by Letters Patent, is—

1. The movable pieces C C, in combination with the shaft B, collars E E, or their equivalents, screws D D, and India-rubber washers, or their equivalents, as and for the purposes described.

2. The combination of the pieces C C, shaft B, screws D D, India-rubber washers, and seats F F.

3. The piece L of the connecting-rod K, extended as shown, for the purpose specified, and combining the screw H, journal-box M, and curve surrounding the hole N, substantially as described.

A. FONTAYNE.

Witnesses:
JAMES MOORE,
SAM'L S. FISHER.